(12) United States Patent
Li

(10) Patent No.: US 7,196,696 B2
(45) Date of Patent: Mar. 27, 2007

(54) POSITION TOUCH SCREEN PANEL AND METHOD OF ARRANGING A RESISTIVE SENSING CIRCUIT THEREOF

(76) Inventor: Tsung-Ying Li, 3F, No. 12, Lane 48, Chih-Hui St., Banchiao City, Taipei Hsien (TW)

( * ) Notice: Subject to any disclaimer, the term of this patent is extended or adjusted under 35 U.S.C. 154(b) by 589 days.

(21) Appl. No.: 10/804,025

(22) Filed: Mar. 19, 2004

(65) Prior Publication Data

US 2005/0206624 A1     Sep. 22, 2005

(51) Int. Cl.
*G09G 5/00* (2006.01)
(52) U.S. Cl. .................. 345/173; 345/174; 178/18.01
(58) Field of Classification Search ........ 345/156–166, 345/173–178; 178/18.01, 18.05, 18.06; 341/33–34
See application file for complete search history.

(56) References Cited

U.S. PATENT DOCUMENTS

| 5,818,430 | A | * | 10/1998 | Heiser | ........................ 345/174 |
| 6,380,931 | B1 | * | 4/2002 | Gillespie et al. | ............. 345/173 |
| 6,630,896 | B1 | * | 10/2003 | Nathan | ......................... 341/34 |
| 2002/0090798 | A1 | * | 7/2002 | Ahn et al. | ................... 438/455 |
| 2003/0222857 | A1 | * | 12/2003 | Abileah | ....................... 345/173 |
| 2004/0217945 | A1 | * | 11/2004 | Miyamoto et al. | .......... 345/173 |

* cited by examiner

*Primary Examiner*—Richard Hjerpe
*Assistant Examiner*—Mansour M. Said
(74) *Attorney, Agent, or Firm*—Bacon & Thomas, PLLC

(57) ABSTRACT

A position touch screen panel using a unique pattern of arranging the resistive sensing circuit, in which the touch screen panel is formed by two substrates symmetrically overlapped, having four sensor lines extending along the periphery of the substrates and creating parallel connections to cover four corners, such that at least one pair of parallel connections in opposite corners (on diagonal corners) shall attain matching voltages, where the matching voltages shall be realized only if high voltage is measured from parallel connections at one corner; and low voltage is measured from parallel connections in an opposite corner; whereby voltage levels at corner points are defined relative to other corner points on one sensor line, not from comparison of two sensor lines. Using the above circuit arrangement, the touch screen panel is able to determine the touch position accurately.

5 Claims, 5 Drawing Sheets

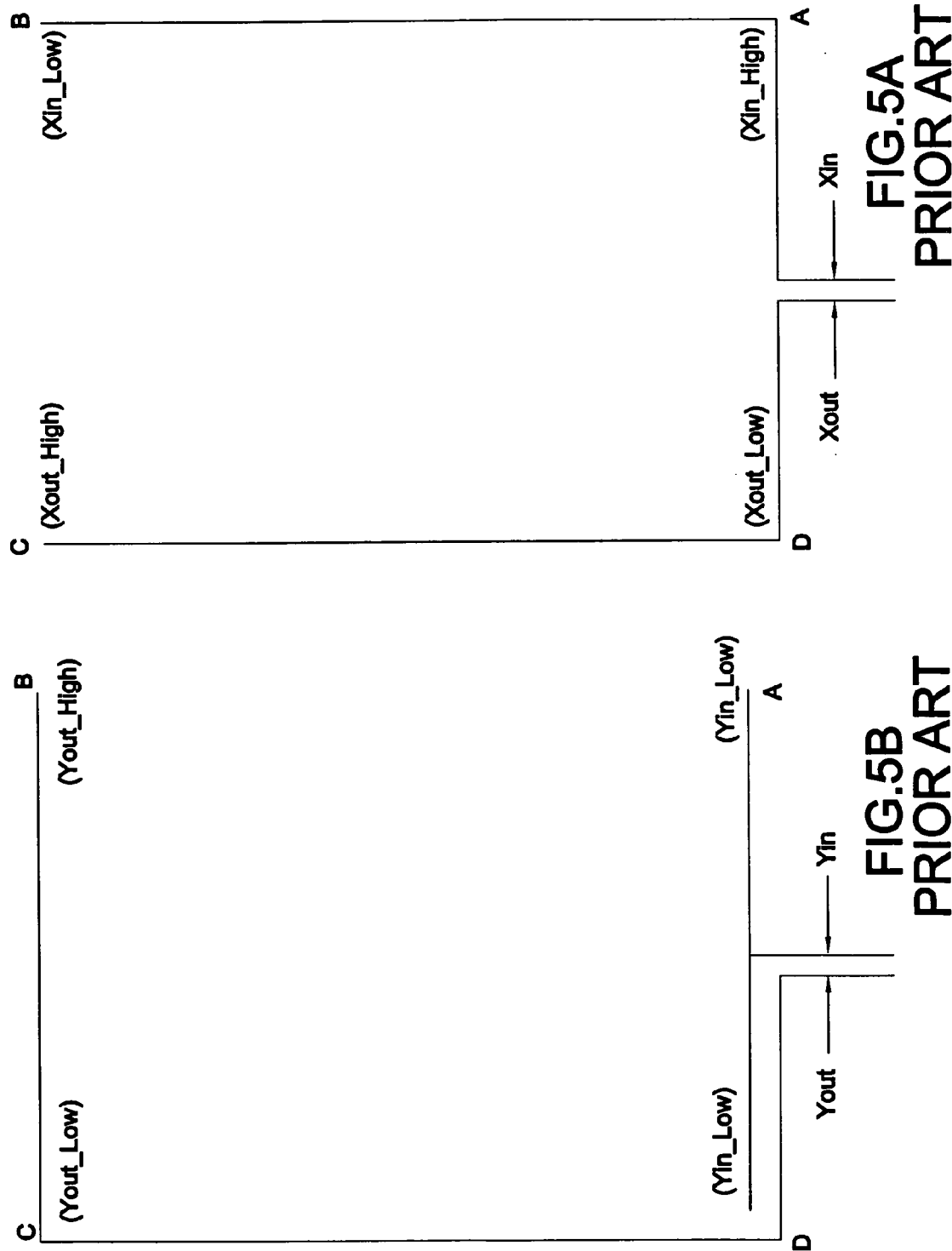

POSITION TOUCH SCREEN PANEL AND METHOD OF ARRANGING A RESISTIVE SENSING CIRCUIT THEREOF

BACKGROUND OF THE INVENTION

1. Field of the Invention

The present invention is related to a position touch screen panel and method of arranging the resistive sensing circuit, and more particularly to an analog-based touch screen panel that is used as an input to electronic devices.

2. Description of Related Art

Touch screen panels can be driven by resistive, capacitive, ultrasonic or infrared mechanism. Since the costs of resistive components are more competitive than the others, resistive touch screen panels are widely used as inputs to PDAs, electronic notepads, LCD display terminals, etc.

A position touch screen panel is basically formed by two glass substrates symmetrically overlapped, leaving a narrow gap in between the substrates. A conductive film is coated on the underside of the substrates, and a sensing circuit is arranged on the periphery of the substrates. When an object or finger touches the surface of the substrate, the resistive sensing circuit is excited to produce a corresponding voltage gradient, and thus the coordinates of the point of contact can be determined.

In this line of products, analog-based touch screen panels are the mainstream, as digital-based touch screen panels at this stage are not yet cost competitive. The costs of related components need to be further reduced to allow for large-scale production.

In FIG. 4, a position touch screen panel is formed by two symmetrically overlapped substrates (71) (72), each having a conductive layer on the inner surface, and a sensing circuit consisting of four sensor lines (Xin) (Xout) (Yin) (Yout) is arranged along the periphery of the substrates (71) (72).

The detailed arrangements of the sensor lines (Xin) (Xout) (Yin) and (Yout) are to be described below, in conjunction with FIGS. 5A, 5B.

The two sensor lines (Xin) (Xout) on the substrate (71) are used to measure a voltage gradient in the X direction, whereas the two sensor lines (Yin) (Yout) on the substrate (72) are used to measure a voltage gradient in the Y direction.

The X direction sensor line (Xin), as shown in FIG. 5A, is formed on the right side along the periphery of the substrate (71) connecting corner A and corner B serially, whilst sensor line (Xout) is formed on the left side of the substrate (71), connecting corner D and corner C serially. The input and output terminals are located on one end, in the middle section on the lower side of the substrate (71).

The Y direction sensor line (Yin), as shown in FIG. 5B, is formed on the lower side of the substrate (72) along the periphery, and an input terminal is connected to the middle section of the sensor line (Yin). The sensor line (Yout) starts off from one end, which is the output terminal, on the lower side of the substrate (72) and adjacent to the terminal end of the sensor line (Yin), and bends to the left and runs along the lower side to corner D, and then bends upward to corner C, and then again bends to the right and runs along the upper side to corner B of the substrate (72).

When an object or finger touches the surface of the substrate, a voltage excitation is produced (5 V is used in the present example). The measured voltage from corner A connection of the sensor line (Xin), as shown in FIG. 5A, is approximately 4.9718V. As the sensor line extends, the internal impedance of the line causes decay of signal strength in proportion to the length of the sensor line, so that the measured voltage from corner B connection shall be lower, and in the present example, the voltage over corner B connection is approximately 4.9127V. Thus, voltage over corner A connection is defined as a high voltage level, whereas voltage over corner B connection is defined as a low voltage level, hereinafter respectively denoted by (Xin_High) and (Xin_Low). Voltage levels at corner points are defined relative to other corner points on one sensor line. Then, 0.0816V is measured over corner C connection of sensor line (Xout) and 0.0271V over corner D connection of sensor line (Xout), hereinafter denoted by (Xout_High) and (Xout_Low).

Referring back to FIG. 5B, the highest voltage (5V) appears in the middle section of the sensor line (Yin), near the input terminal, and the voltages over two corners A and D connections are almost equal (4.975V), thus these two are denoted by (Yin_Low). On another sensor line (Yout), the highest voltage is measured over corner B connection (0.797V), and the voltage over corner C connection is lower at (0.459V), hereinafter respectively denoted by (Yout_High) and (Yout_Low).

Since the two substrates (71) (72) are overlapped symmetrically, corners A–D on substrates (71) (72) are lined up to form parallel connection pairs. but this has created a problem of mismatch of voltage pairs.

Using corners A and C as an example to illustrate a mismatch of voltage level existing over the connection pairs in opposite corners of a conventional touch screen panel. The parallel connection pair in corner A is (Xin_High)+(Yin_Low), and the parallel connection pair in corner C is (Xout_High)+(Yout_Low), thus a (High+High) pair and a (Low+Low) pair in corner A and corner C of the touch screen panel cannot be created. According to the voltage levels previously defined for all corners, this circuit arrangement cannot attain matching voltages in opposite corners. Therefore, the sensing circuit cannot measure voltage gradient accurately during a touch of the screen, and the calculation of coordinates of contact point will produce substantial errors. For the same reason, the voltage levels in opposite corners B and D are also not symmetrical. The touch screen panel is therefore unable to determine touch positions accurately using the conventional pattern of arranging the sensing circuit.

SUMMARY OF THE INVENTION

The main object of the present invention is to provide a position touch screen panel using a unique pattern of arranging the resistive sensing circuit that is able to determine the touch position accurately.

To this end, the method of arranging the resistive sensing circuit comprises the steps of:

arranging the sensor lines on two substrates in a way that allows the two substrates to be symmetrically overlapped; and making parallel connections along the path of the sensor lines, such that at least one pair of parallel connections in opposite corners is to attain matching voltages by fulfilling the conditions:

measured voltages from first corner connections of sensor lines being high, and measured voltages from second corner connections of sensor lines being low, whereby the first and second corner connections respectively exist in opposite corners of the touch screen panel; and voltage levels at corner points are defined relative to other corner points on one sensor line.

Using the above circuit arrangement scheme, the present touch screen panel is able to measure a voltage gradient accurately in order to determine the contact position during a touch of the screen.

Other objectives, advantages and novel features of the invention will become more apparent from the following detailed description when taken in conjunction with the accompanying drawings.

BRIEF DESCRIPTION OF THE DRAWINGS

FIG. 5A is a circuit layout diagram of the X direction sensor lines in a conventional touch screen panel; and FIG. 5B is a circuit layout diagram of the Y direction sensor lines in a conventional touch screen panel.

DETAILED DESCRIPTION OF THE PREFERRED EMBODIMENT

Figure 1:
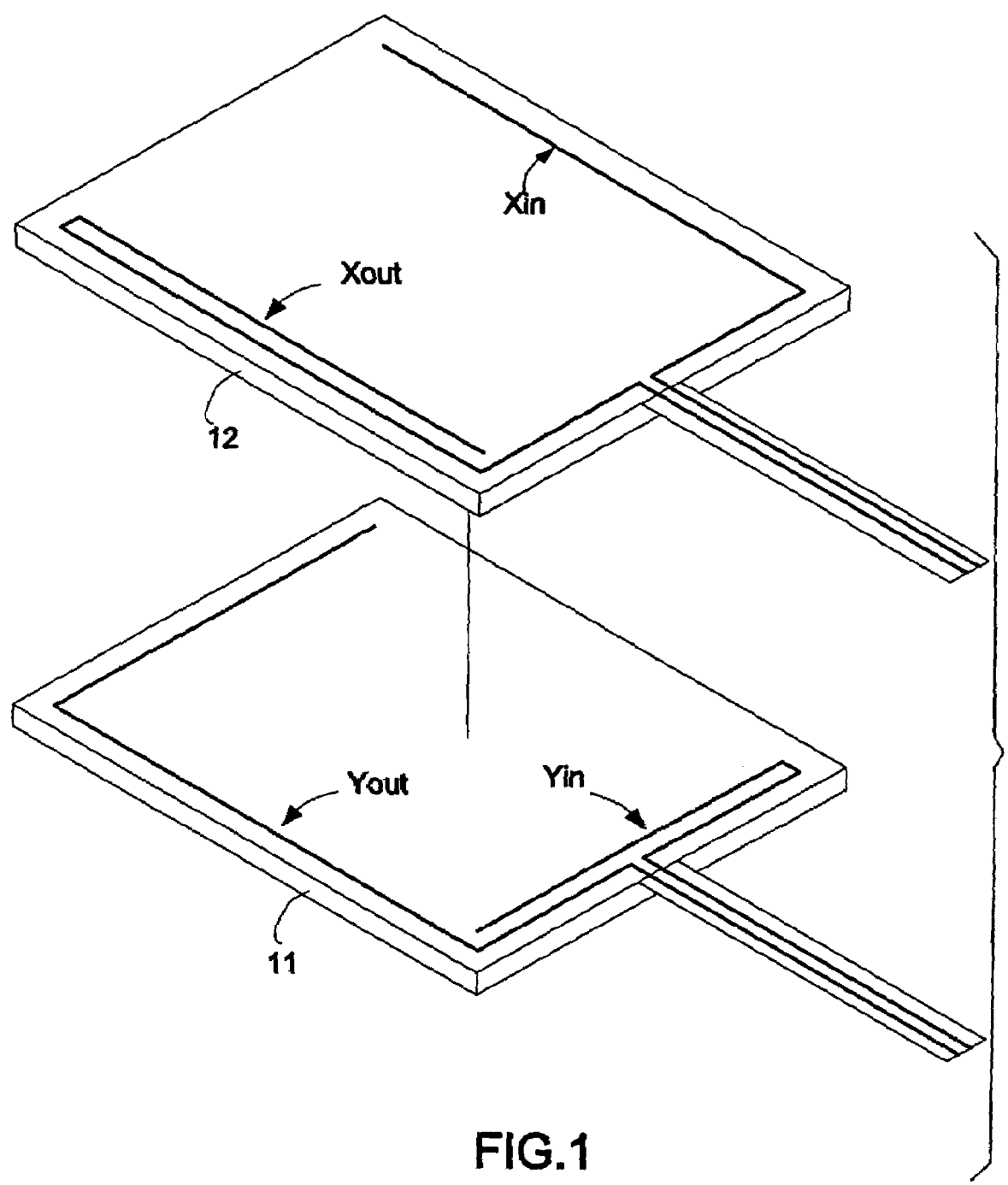
FIG. 1 is an exploded diagram of a position touch screen panel in accordance with the first preferred embodiment of the invention.

The present invention is illustrated through a first preferred embodiment shown in FIG. 1, in which a position touch screen panel using a unique pattern of arranging the resistive sensing circuit is disclosed. The touch screen panel is formed by a first and a second substrate (11), (12) symmetrically overlapped, and a resistive sensing circuit is formed on the periphery of the substrates, consisting of four sensor lines (Xin), (Xout), (Yin), and (Yout), which are arranged in a way to satisfy the conditions of matching voltages:

measured voltages from first corner connections of sensor lines are to be high, whereas measured voltages from second corner connections of sensor lines are to be low, where the first and second corner connections respectively exist in opposite corners of the touch screen panel.

Figure 2A:
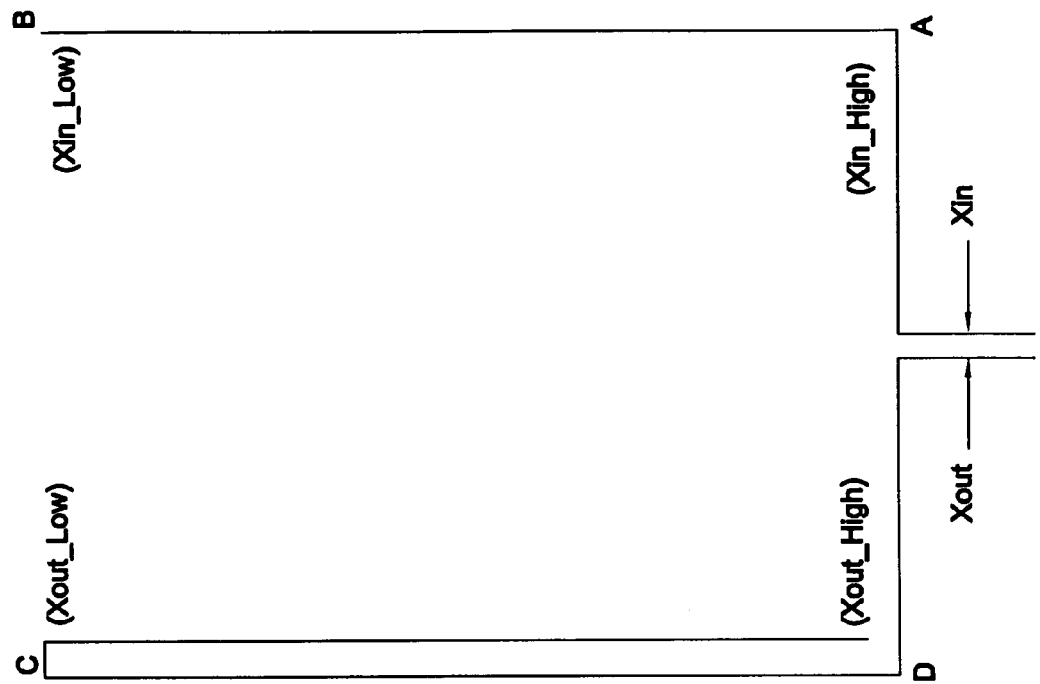
FIG. 2A is a circuit layout diagram of sensor lines of the present touch screen panel in the X direction.
Figure 2B:
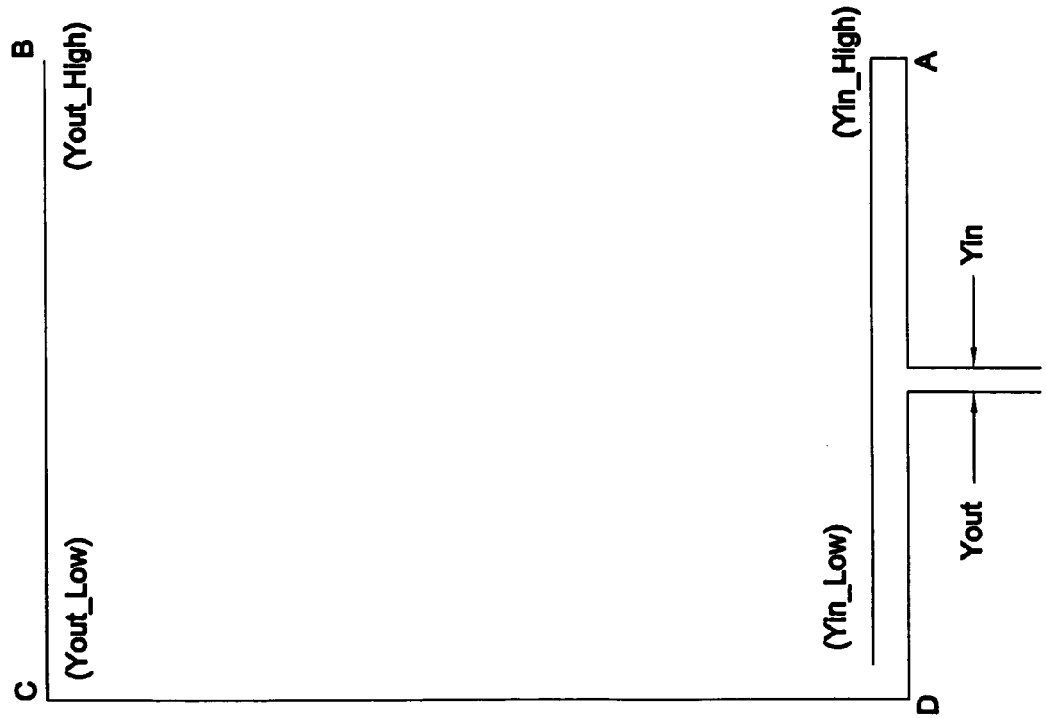
FIG. 2B is a circuit layout diagram of sensor lines of the present touch screen panel in the Y direction.

The actual circuit arrangement of the resistive sensing circuit is to be illustrated through the first preferred embodiment of the invention, in conjunction with FIGS. 2A and 2B.

The present touch screen panel is formed by the two substrates (11) (12) symmetrically overlapped, in the same way as prior touch screen panels, but the arrangement of the sensing circuit on the two substrates (11) (12) is unique, in that the two sensor lines (Yin) (Yout) on the first substrate (11) are used to measure voltage gradient in the Y direction, and the two sensor lines (Xin) (Xout) on second substrate (12) are used to measure voltage gradient in the X direction.

The two sensor lines (Yin) (Yout) in the Y direction are arranged as shown in FIG. 2B. The sensor line (Yin) starts off from one end in the middle section of the lower side on the first substrate (11) and bends to the right and runs along the lower side to corner A, and then bends to the left and runs along the lower side to corner D, such that the voltage over corner A connection of the sensor line (Yin) is higher than that over corner D connection of the sensor line (Yin), hereinafter respectively denoted by (Yin_High) and (Yin_Low).

The sensor line (Yout) also starts off from one end in the middle section of the lower side, adjacent to the terminal end of sensor line (Yin) on substrate (11), and bends to the left and runs along the lower side to corner D, then bends upward to corner C, and then bends right to corner B, such that the voltage over corner B connection of the sensor line (Yout) is higher than that over corner C connection of the sensor line (Yout), hereinafter respectively denoted by (Yout_High) and (Yout_Low).

The two X direction sensor lines (Xin) (Xout) are arranged as shown in FIG. 2A. The sensor line (Xin) starts off from one end in the middle section of the lower side on the second substrate (12), and bends to the right and runs along the lower side to corner A, and then bends upward to corner B, such that the voltage over corner A connection of the sensor line (Xin) shall be higher than that over corner B connection of the sensor line (Xin), hereinafter respectively denoted by (Xin_High) and (Xin_Low).

The sensor line (Xout) also starts off from one end in the middle section of the lower side of the second substrate (12), and bends to the left and runs along the lower side to corner D, and then bends upward to corner C and then bends to corner D, such that the voltage over corner D connection of the sensor line (Xout) shall be higher than that over corner C connection of the sensor line (Xout), hereinafter respectively denoted by (Xout_High) and (Xout-Low).

Once the above two substrates (11) (12) are overlapped symmetrically, the pair of parallel connections in opposite corners A and C, and/or the pair of parallel connections in opposite corners B and D, shall be able to attain matching voltages. In the present example, the pair of parallel connections in corner A is represented by the combination (Xin_High)+(Yin_High), and the pair of parallel connections in opposite corner C is represented by the combination (Xout_Low)+(Yout_Low). Thus, this example demonstrates that at least one pair of parallel connections in opposite corners of the touch screen panel is matched with (High+High) voltage pair and (Low+Low) voltage pair.

It shall be noted that voltage levels at corner points are defined relative to other corner points on one sensor line, and not to be derived from comparison of two different sensor lines.

Figure 3:
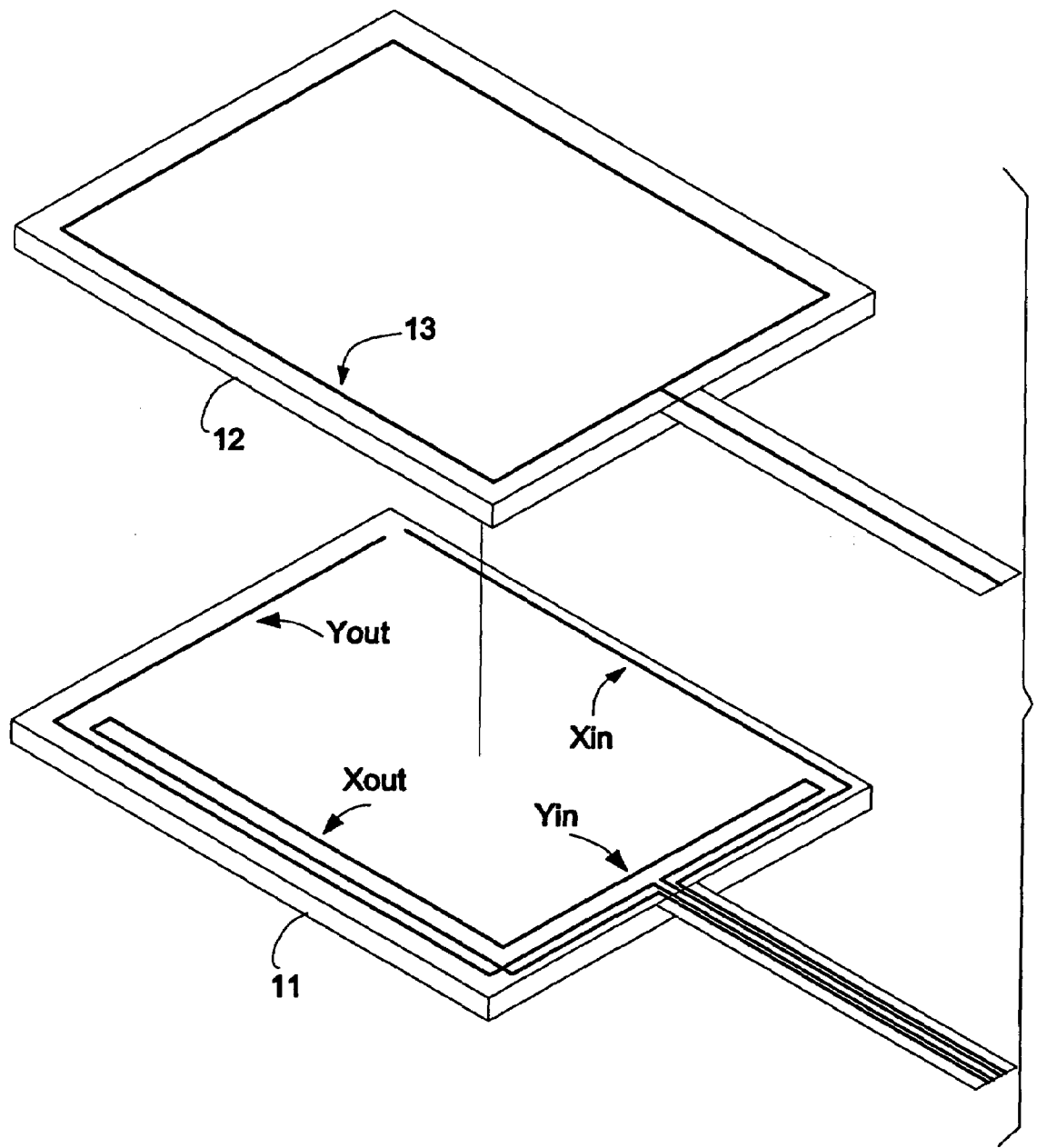
FIG. 3 is an exploded diagram of the second preferred embodiment of the invention.
Figure 4:
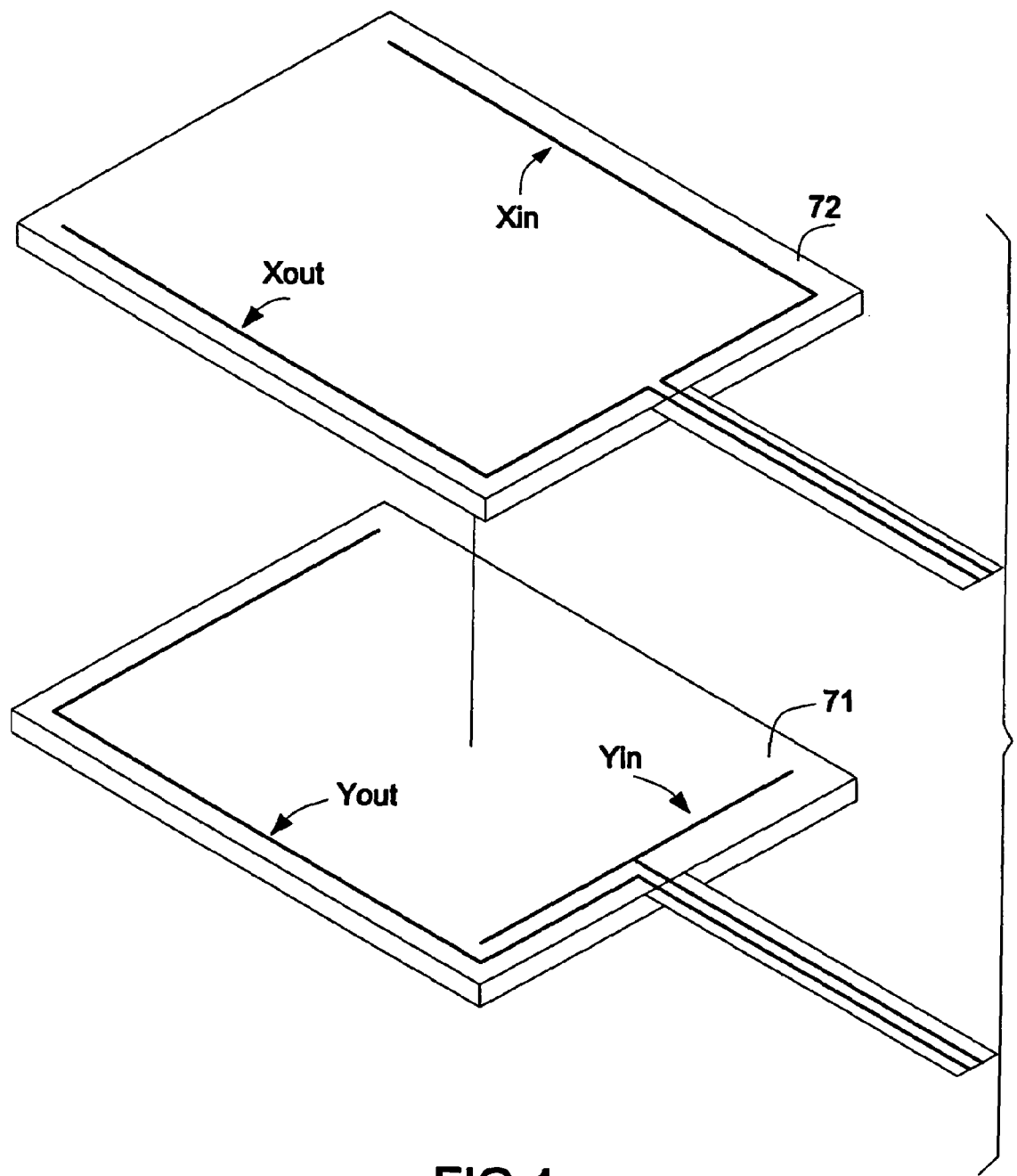
FIG. 4 is an exploded diagram of a conventional touch screen panel.

In the first preferred embodiment of the invention, the touch screen panel uses a sensing circuit with four sensor lines (Xin) (Xout) (Yin) and (Yout) on two overlapped substrates (11, 12). However, another circuit arrangement is shown in FIG. 3, as the second preferred embodiment of the invention, in which the first substrate (11) not only has two Y direction sensor lines (Yin) (Yout), but also two sensor lines (Xin) (Xout) in the X direction as well. The second substrate (12) has a common sensing line (13) that runs along the periphery of the substrate (12) to form a completely closed loop. The above two types of sensor lines (Xin) (Xout) (Yin) and (Yout) are arranged on the substrate (11) in the same manner as in the previous example. Using this circuit arrangement, the touch position on the touch screen panel can be determined with even greater precision.

The above mentioned embodiments only provide working models of the present invention, and are not necessarily to be the only ways to arrange the sensing circuit to attain matching voltages. Nevertheless, the above circuit arrangements have demonstrated that the present touch screen panel is able to measure the voltage gradient accurately, thus the position of the contact point over the touch screen panel can be accurately determined.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of arranging the resistive sensing circuit on a position touch screen panel, comprising the steps of:
    arranging the resistive sensing circuit, consisting of sensor lines (Xin), (Xout), (Yin), and (Yout), on two substrates (11, 12) in a way that allows the two substrates to be symmetrically overlapped, such that each substrate has two sensor lines in an X or a Y direction; and
    making parallel connections along the path of the sensor lines, (Xin), (Xout), (Yin), and (Yout), such that at least one pair of parallel connections in opposite corners (on diagonal lines) of the touch screen panel is able to attain matching voltages;
    wherein the pair of parallel connections in opposite corners (on diagonal lines) to attain matching voltages shall fulfill the conditions:
    measured voltages from first corner connections of sensor lines are high, and
    measured voltages from second corner connections of sensor lines are low,
    whereby the first and second corner connections respectively exist in diagonal opposite corners of the touch screen panel, and
    voltage levels at corner points are defined relative to other corner points on one sensor line, not from comparison of two sensor lines.

2. A position touch screen panel, comprising:
    a first substrate (11) with a periphery including four corners and having two Y direction sensor lines (Yin) (Yout) that extend along the periphery to cover all four corners; and
    a second substrate (12), with a periphery including four corners and being placed over the first substrate (11), having two X direction sensor lines (Xin) (Xout) that extend along the periphery of the second substrate to cover all four corners of the second substrate;
    whereby, after the above two substrates (11, 12) are symmetrically overlapped, at least one pair of parallel connections in opposite corners (on diagonal lines) of the touch screen panel shall attain matching voltages;
    wherein the pair of parallel connections in opposite corners (on diagonal lines) shall attain matching voltages by fulfilling the conditions:
    measured voltages from first corner connections of sensor lines are high, and
    measured voltages from second corner connections of sensor lines are low,
    whereby the first and second corner connections respectively exist in opposite corners of the touch screen panel and
    voltage levels at corner points are defined relative to other corner points on one sensor line, not from comparison of two sensor lines.

3. The position touch screen panel according to claim 2, wherein the touch screen panel has four corners A, B, C and D sequentially arranged in a counter-clockwise direction, and the pairs of corners A and C, and corners B and D are arranged in opposite corners (on diagonal lines) of the touch screen panel, and the sensor lines (Xin), (Xout), (Yin), and (Yout) have multiple parallel connections along the path to cover the four corners of the touch screen panel, whereby:
    the sensor line (Yin) of the first substrate (11) starts from one end in the middle section of the lower side of the first substrate (11), connects to corner A, and then returns to corner D, such that the voltage over corner A connection of the sensor line (Yin) is higher than that over corner D connection of the sensor line (Yin);
    the sensor line (Yout) of the first substrate starts from one end in the middle section of the lower side of the first substrate (11), connects to corner D, corner C, and then turns to corner B, such that the voltage over corner B connection of the sensor line (Yout) shall be higher than that over corner C connection of the sensor line (Yout);
    sensor line (Xin) of the second substrate (12) starts off from one end in the middle section of the lower side of the second substrate (12), connects to corner A, and corner B serially, such that the voltage over corner A connection of the sensor line (Xin) shall be higher than that over corner B connection of the sensor line (Xin); and
    sensor line (Xout) of the second substrate (12) starts off from one end in the middle section of the lower side of the second substrate (12), connects to corner D, to corner C, and then returns to corner D, such that the voltage over corner D connection of the sensor line (Xout) shall be higher than that over corner C connection of the sensor line (Xout);
    whereby the pair of parallel connections in opposite corners A and C shall fulfill the conditions of matching voltages.

4. A position touch screen panel, comprising:
    a first substrate (11) with a periphery including four corners and having four sensor lines (Xin) (Xout) (Yin) (Yout) in X, Y directions on an inner surface that extends along the periphery of the substrate to cover all the four corners; and
    a second substrate (12) with a periphery being placed over the first substrate (11) and having a common sensing line (13) on an inner surface that extends along the periphery of the substrate (12) to form a closed loop;
    whereby, after the above two substrates (11, 12) are symmetrically overlapped, at least one pair of parallel connections in opposite corners (on diagonal lines) of the first substrate (11) shall attain matching voltages;
    wherein the pair of parallel connections in opposite corners (on diagonal lines) shall attain matching voltages by fulfilling the conditions:
    measured voltages from first corner connections of sensor lines are high, and
    measured voltages from second corner connections of sensor lines are low,
    whereby the first and second corner connections respectively exist in opposite corners of the touch screen panel and
    voltage levels at corner points are defined relative to other corner points on one sensor line, not from comparison of two sensor lines.

5. The position touch screen panel according to claim 4, wherein the touch screen panel has four corners A, B, C, D sequentially arranged in a counter-clockwise direction, and the pairs of corners A and C, and B and D, are opposite corners of the touch screen panel, and the four sensor lines (Xin), (Xout), (Yin), and (Yout) in the X, Y directions on the first substrate have multiple parallel connections along the path to cover the four corners of the touch screen panel, whereby:

the sensor line (Yin) of the first substrate (11) starts from one end in the middle section of the lower side of the first substrate, connects to corner A, and then returns to corner D, such that the voltage over corner A connection of the sensor line (Yin) shall be higher than that over corner D connection of the sensor line (Yin);

the sensor line (Yout) on the first substrate (11) starts off from one end in the middle section of the lower side, connects to corner D, corner C, and then turns to corner B, such that the voltage over the corner B connection of the sensor line (Yout) shall be higher than that from the corner C connection of the sensor line (Yout);

the sensor line (Xin) on the first substrate (11) starts from one end in the middle section of the lower side, connects to corner A and corner B serially, such that the voltage over the corner A connection of the sensor line (Xin) shall be higher than that from the corner B connection of the sensor line (Xin); and the sensor line (Xout) on the first substrate (11) starts from one end in the middle section of the lower side, connects to corner D and corner C and then returns to corner D, such that the voltage over the corner D connection of the sensor line (Xout) shall be higher than that from the corner C connection of the sensor line (Xout);

whereby parallel connections in opposite corners A and C shall fulfill the conditions of matching voltages.

* * * * *